United States Patent [19]

Kastner et al.

[11] 4,125,574

[45] Nov. 14, 1978

[54] PROCESS AND APPARATUS FOR THE CONTINUOUS PRODUCTION OF VINYL CHLORIDE POLYMERS IN AQUEOUS EMULSION

[75] Inventors: Paul Kastner, Burgkirchen, Alz; Christoph Heinze, Burghausen, Salzach, both of Fed. Rep. of Germany

[73] Assignee: Hoechst Aktiengesellschaft, Frankfurt am Main, Fed. Rep. of Germany

[21] Appl. No.: 802,493

[22] Filed: Jun. 1, 1977

[30] Foreign Application Priority Data

Jun. 4, 1976 [DE] Fed. Rep. of Germany ....... 2625149

[51] Int. Cl.$^2$ .......................... C08F 2/22; C08F 14/06; C08F 291/02
[52] U.S. Cl. ...................................... 260/884; 526/88; 526/344.2; 526/345; 422/135
[58] Field of Search ...................... 526/88, 344.2, 345; 260/884

[56] References Cited

U.S. PATENT DOCUMENTS

| | | |
|---|---|---|
| 3,578,649 | 5/1971 | Badguerahanian et al. ...... 526/344.2 |
| 3,627,744 | 12/1971 | Hopkins et al. ...................... 260/884 |
| 3,749,555 | 7/1973 | Beckmann et al. .................. 526/918 |
| 3,842,055 | 10/1974 | Gabriel et al. ...................... 526/344.2 |
| 3,970,610 | 7/1976 | Ruchlak et al. ...................... 260/884 |

*Primary Examiner*—Alan Holler
*Attorney, Agent, or Firm*—Connolly and Hutz

[57] ABSTRACT

A continuous process and an apparatus for the polymerization of vinyl chloride in aqueous emulsion wherein the liquid reaction mixture is fed into the lower part of a vertical, cylindrical vessel, the liquid level in the vessel is adjusted to at most 97% of the total interior height of the vessel, the reaction mixture is stirred with a stirrer which is totally immersed in the liquid and extends over 15 to 60% of the total interior height of the vessel and the produced polymer emulsion is laterally discharged from the upper part of the vessel.

7 Claims, 4 Drawing Figures

FIG.1

PROCESS AND APPARATUS FOR THE CONTINUOUS PRODUCTION OF VINYL CHLORIDE POLYMERS IN AQUEOUS EMULSION

The invention relates to a process and apparatus for the continuous production of vinyl chloride homo-, co- and graft polymers in aqueous dispersion in the presence of radical-forming catalysts, surface-active substances and optionally other polymerisation auxiliaries in upright, preferably cylindrical vessels, wherein the reaction mixture is introduced from below, removed from above at the side and stirred with a stirrer which is completely immersed in the liquid and extends over 15 to 60% of the total internal height of the vessel.

It is known to produce vinyl chloride polymers in aqueous emulsion in upright cylindrical vessels, wherein there is constantly added to the reaction mixture, in the upper part of the vessel, vinyl chloride, possibly comonomers, an aqueous solution of the emulsifier and optionally other polymerisation auxiliaries, as well as a solution of the radical-forming catalyst, and a volume of the polymer-containing emulsion equivalent to the quantity of substances added is drawn off at the base of the vessel and conducted away for further processing. The emulsion to be polymerised is in general moved by a stirrer which dips into the upper region of the emulsion and chiefly effects the emulsification of the monomer or monomers introduced. The resulting reaction heat is usually removed by a double jacket, charged with a coolant, of the vessel or sometimes also by special members fitted into the vessel (cooling fingers) or onto the vessel (return flow coolers).

It is furthermore known to emulsify monomers and aqueous emulsifier first, and to charge the reaction vessel with this emulsion and add the initiator either simultaneously or later.

Although the afore-described process has been employed for a long time on a large industrial scale it has certain deficiencies. For example, after operating for some time, crusts form in particular in the upper part of the reaction vessel in the region of the surface of the liquid, and these make continuation of polymerisation difficult and, if they crumble away partially the polymer emulsion drawn off becomes contaminated. If the crust growth is too great the apparatus must be shut down and cleaned, and this involves considerable expenditure on labour, loss of production and undesirable emission of vinyl chloride when the container is opened. In addition, in the course of the polymerisation process coarse polymer particles are constantly formed, that is particles of a diameter of more than 0.1 mm (referred to hereinafter as "grit"), which in some cases can grow to diameters of up to several centimeters. This grit is drawn off with the polymer emulsion and leads to difficulties in further processing. Although it is possible to keep back some of this grit by means of filter sieves, these filters are quickly blocked if there is relatively extensive grit formation. Changing and cleaning the filters entails undesirable expenditure. In addition, finer grit is often not held back completely, contaminates the end product, and on further processing of the polymer into moulded articles results in the formation of spots or fish eyes.

The hitherto customary blade stirrers, especially in vessels having a large ratio of height to diameter, for example 3 or more, operate substantially in the upper part of the container, whereas the liquid is mixed only slightly in the zones beneath.

A process is furthermore known for the continuous production of aqueous polymer dispersions by polymerisation of the monomers, pre-emulsified in water, with initiators and emulsifiers as they pass through a tube reactor, in which by damming in the reactor the polymer emulsion flowing off, a pressure is produced which is sufficient to prevent dissociation as a result of evaporation of the monomers at the polymerisation temperature applied, wherein, further, the reactor content is mixed perpendicular to the direction of flow by a stirring device, of which the faces inside the polymerisation zone are parallel to the direction of flow and are cleaned periodically or continuously, without interrupting the stirring action, by strippers displaceable in the direction of flow. In this process at least a part of the edge of the stirring device or of the stripper brushes over the reactor wall within the polymerisation zone at the smallest possible distance from this wall.

This process has the disadvantage that as a result of stirrer parts or strippers running along the reactor wall at the smallest possible distance therefrom, there is a high shear rate especially at high stirrer speeds, which result in coagulation in the case of shear-sensitive emulsions. In addition, the stirring devices extend over the whole length of the polymerisation vessel, which causes construction difficulties in the case of relatively tall vessels. This design of the stirring devices effects mixing of the liquid only in the direction perpendicular to the axis of the vessel. Consequently relatively pronounced differences in concentration of the layers of liquid lying one above the other arise which, especially in the case of emulsion polymerisation where reaction mixture is introduced from below, may result in the formation of grit, for example if, as a result of sudden fluctuations in the supply or removal or liquid, uncontrolled mixing occurs between the liquid layers of different concentration. The coatings deposited on the stirring devices are removed by a mechanical stripping device which is awkward to handle especially in the case of relatively large vessels, and its movable carrier acting through the vessel wall causes sealing problems. In addition, the stripped-off coating mixes with the polymer dispersion and contaminates it. To avoid the deposition of crusts which are formed on the stirring device and to a greater extent at the boundary surface between liquid and gas space, the reaction tube must be absolutely full. Consequently an additional buffer vessel is required in the withdrawal pipe for the polymer emulsion.

A process and an apparatus have now been found that do not have the above-described disadvantages.

This process for the continuous production of vinyl chloride homo-, co- or graft polymers in aqueous emulsion in the presence of radical-forming catalysts, surface-active substances and, optionally, other polymerisation auxiliaries in an upright, preferably cylindrical vessel with a ratio of height to diameter (both values measured internally) of at least 3 and a capacity of at least 5 m$^3$, whilst moving the polymerisation mixture and regulating the level of the liquid in the vessel is characterised in that the polymer dispersion is discharged from the vessel at the side at a level which is situated 30 to 90% of the total internal height of the vessel above the inlet for the starting substances and at least 15 cm below the surface of the liquid, the standing level of the liquid is regulated to a maximum of 97% of the total internal height of the vessel and the content of the vessel is moved by at least one stirring device which extends in the liquid over 15 to 60% of the total internal height of the vessel, ends at least 20 cm below the surface of the liquid and stays at a distance of at least 15 cm from the vessel wall.

There is to be understood by "total internal height of the vessel", the distance of the lowest point of the vessel base from the highest point of the vessel cover measured internally, openings and bulges of cross-sections of less than 1/5 of the internal diameter of the vessel being discounted.

The standing level of the liquid in the vessel is measured according to known methods and the discharge of liquid is advantageously so controlled by the measurement signal that the surface of the liquid in the vessel is at least 15 cm above the upper edge of the discharge opening.

The starting substances for the polymerisation are introduced in liquid, dissolved or dispersed form at the bottom, or advantageously laterally with respect to the wall of the vessel, in the lower third of the vessel.

The starting substances, for example monomers, aqueous solution of the surface-active substances and solution of the radical-forming catalysts, may be introduced into the vessel separately or mixed or pre-emulsified shortly before introducing into the polymerisation vessel. Tuyeres, rapid-rotation or oscillation stirrers, ultrasonic devices or colloid mills, for example, are suitable for mixing.

It may be advantageous to provide a second stirrer, acting essentially only in the region of the inlet openings for the starting substances, to ensure thorough mixing of these starting substances. This second stirrer may be operated independently of the main stirrer, but should run in the same direction in order to avoid excessive turbulence. The second stirrer should stay at least 15 cm from the inner wall of the vessel and extend, at most, over 10% of the total internal height of the vessel.

The polymer emulsion is removed from the vessel at the side at a level situated at 30 to 90% of the total internal height of the vessel above the inlet for the starting substances. If the emulsion is removed at a point below 30% of the height of the vessel, the dispersion contains too much unreacted starting substances, and if it is removed at a point above 90% of the height of the vessel the gas space in the upper part of the vessel is generally not large enough and this may lead to difficulties in regulating the pressure. Preferably, the polymer emulsion is removed at a level which is situated 50 to 90%, especially advantageously at a level situated 70 to 85%, of the total internal height of the vessel above the inlet for the starting substances.

The standing level of the liquid in the vessel should be at least 15 cm above the discharge opening, so as to ensure that no gas is simultaneously drawn off with the liquid, but principally so that the discharge opening is substantially kept free of crusts and coatings which form predominantly at the areas of the inner walls of the vessel close to the surface of the liquid. Advantageously the distance of the surface of the liquid from the discharge opening is 8 to 25% of the total internal height of the vessel, but must be at least 40 cm.

The content of the vessel is stirred by at least one stirring device, which is totally immersed in the liquid. The stirring device should end at least 20 cm below the lowest point of the surface of the liquid, it being necessary to take into consideration the formation of a so-called whirlpool especially when the stirrer is operated at relatively high speeds. If the surface of the liquid is less than 20 cm away from the stirring device, an undesirable crust formation can occur in the areas of the stirring device close to the surface.

The outer edges of the stirring device should stay at a minimum distance of 15 cm from the vessel wall so that, especially at relatively high speeds, too large a shearing rate, which leads to coagulation in sensitive emulsions, does not occur. The minimum distance from the wall is preferably 25 cm.

The stirring device should extend over 15 to 60% of the internal height of the polymerisation vessel. Below 15% adequate mixing of the total liquid content of the vessel is not achieved; above 60% adequate axial mixing of the vessel content no longer occurs. Preferably a stirring device is used that extends over 20 to 40% of the internal height of the vessel and that ends approximately 25 cm below the surface of the liquid.

The peripheral speed of the stirring device may vary within wide limits depending on the type of polymerisation process used, especially on the type and quantity of the surface-active substances used, and on the desired particle size and shape. Generally, peripheral speeds of 0.2 to approximately 10 m/sec are used.

The process according to the invention is suitable for homo-, co- and graft polymerisation of vinyl chloride in aqueous emulsion. The polymerisation is carried out at 10° to 90° C., preferably at 30° to 80° C., especially at 40° to 75° C. For the copolymerisation of vinyl chloride, a total of 0.1 to 99% by weight (calculated on vinyl chloride) for example, of one or more of the following monomers, can be used: olefins, such as ethylene or propylene, vinyl esters of straight-chained or branched carboxylic acids having 2 to 20, preferably 2 to 4 carbon atoms, such as vinyl acetate, -propionate, -butyrate, -2-ethylhexoate, and vinylisotridecanoic acid esters; vinyl halides, such as vinyl fluoride, vinylidene fluoride, vinylidene chloride, vinyl ether, vinyl pyridine, unsaturated acids, such as maleic, fumaric, acrylic and methacrylic acids and their mono- or diesters with mono- or dialcohols having 1 to 10 carbon atoms; maleic acid imide and its N-substitution products with aromatic, cycloaliphatic and optionally branched, aliphatic substituents; acrylonitrile and styrene.

There may be used for graft polymerisation, for example, elastomeric polymers that have been obtained by the polymerisation of one or more of the following monomers: dienes, such as butadiene and cyclopentadiene; olefins, such as ethylene and propylene; styrene, unsaturated acids, such as acrylic or methacrylic acid and the esters of such acids with mono or dialcohols having 1 to 10 carbon atoms; acrylonitrile, vinyl compounds, such as vinyl esters of straight-chained or branched carboxylic acids having 2 to 20, preferably 2 to 4, carbon atoms, vinyl halides, such as vinyl chloride and vinylidene chloride.

The polymerisation can be carried out with or without the use of a seed prepolymer. Polymerisation is carried out in aqueous emulsion in the presence of 0.001 to 3% by weight, preferably 0.01 to 0.3% by weight, calculated on the monomers of radidal-forming catalysts, such as, for example, peroxydisulfates, peroxydiphosphates, perborates of potassium, sodium or ammonium, hydrogen peroxide, tert.-butylhydroperoxide or other water-soluble peroxides, as well as mixtures of various catalysts, wherein catalysts may be used also in the presence of 0.01 to 1% by weight, calculated on the monomers, of one or more reducing substances that are suitable for making up a redox catalyst system, such as, for example, sulfites, bisulfites, dithionites, thiosulfates, aldehyde sulfoxylates, for example, Na-formaldehyde sulfoxylate. Optionally, the polymerisation may be carried out in the presence of 0.05 to 10 ppm, calculated as metal per monomer, of soluble to sparingly soluble metal salts, for example, of copper, silver or iron.

Furthermore, the polymerisation may be carried out in the persence of 0.01 to 5% by weight, calculated on the monomer, of one or more emulsifiers. Anionic, amphoteric, cationic and non-ionic emulsifiers may be used. Suitable anionic emulsifiers are, for example, alkali metal salts, alkaline earth metal salts and ammonium salts of fatty acids, such as lauric acid, palmitic acid or stearic acid, of acid fatty alcohol sulfuric acid esters, of paraffinsulfo acids, of alkylarylsulfo acids, such as dodecylbenzenesulfo acid or dibutylnaphthalenesulfo acid, of sulfosuccinic acid dialkyl esters, and the alkali metal and ammonium salts of epoxy group-containing fatty acids, such as epoxystearic acid with unsaturated fatty acids such as oleic acid or linoleic acid, or unsaturated hydroxy fatty acids, such as ricinoleic aicd. Suitable amphoteric or cation-active emulsifiers are, for example: alkyl betaines, such as dodecyl betaine and alkylpyridinium salts, such as laurylpryidinium hydrochloride, also alkylammonium salts, such as hydroxyethyldodecylammonium chloride. Suitable non-ionic emulsifiers are, for example: partial fatty acid esters of polyhydric alcohols, such as glycerylmonostearate, sorbitol monolaurate, oleate or palmitate, polyoxyethylene ethers of fatty alcohols or aromatic hydroxy compounds; polyoxyethylene esters of fatty acids as well as polypropylene oxide-polyethylene oxide condensation products.

In addition to catalysts and emulsifiers, the polymerisation can be carried out in the presence of buffer substances, for example alkali metal acetates, borax; alkali metal phosphates, alkali metal carbonates, alkali metal bicarbonates, ammonia or ammonium salts of carboxylic acids, as well as in the presence of molecular weight regulators, such as, for example, aliphatic alkehydes having 2 to 4 carbon atoms, chlorohydrocarbons or bromohydrocarbons, such as, for example, dichloroethylene and trichloroethylene, chloroform, bromoform, methylene chloride as well as mercaptans.

Other additives suitable for polymerisation are listed in H. Kainer "Polyvinylchloride and Vinylchlorid-Mischpolymerisate", 1965 edition, pages 34 to 59.

The process according to the invention is suitable especially for the continuous emulsion polymerisation of vinyl chloride polymers having a content of at least 80% by weight (calculated on pure polymer) of polymerisable vinyl chloride units.

The heat produced during the reaction can be removed by cooling the vessel wall by means of cooled built-in fitments or by reflux cooling, wherein the intensity of the cooling can be controlled by measuring the temperature of the reaction mixture.

To prevent the formation of coatings, special substances may be added to the polymerisation mixture, or the internal walls of the vessel and of the built-in fitments may be chemically pretreated, coated or lacquered. Further, the polymerisation may be carried out by producing an electrical potential difference between mutually insulated inner parts of the vessel and of the built-in fitments, optionally with, in addition, spraying of the vessel walls not covered by liquid with water or aqueous solutions.

As a result of the process according to the invention, substantially less extensive formation of grit (undesired large polymer particles) and crusts on the vessel parts and the built-in fitments in the region of the surface of the liquid is established than in the case of the usual procedure with starting substances introduced from above and polymer emulsion removed from below. Blockages of the emulsion outlet, which occur repeatedly with the conventional process, are substantially fewer in number in the process according to the invention. The grit filters (sieves), which in the conventional process are customarily arranged in the polymer emulsion discharge pipe, may be dispensed with. The running time of the polymerisation are significantly prolonged, as a result of which there is a considerable reduction in labour and an increase in capacity. Furthermore, the VC-emission associated with cleaning operations is markedly reduced.

The new process can also be used for shear-sensitive emulsions. A further advantage in comparison with the conventional processes is the greater reliability of operation: if the standing level measurement and control means break down, the polymerisation vessel retains the standing level of the liquid with only slight losses, whereas in the case of the conventional process it can empty to such an extent that the stirrer is no longer immersed or no longer sufficiently immersed in the liquid. As a result of poor mixing and too small a cooling surface, the temperature and pressure can quickly increase in the polymerisation vessel, which results in acute danger to the operating personnel and total loss of the polymerised product.

The subject matter of the invention is furthermore an apparatus, consisting of an upright, cylindrical vessel having a ratio of height to diameter, measured inside the vessel, of at least 3, and a total capacity of at least 5 m$^3$, which contains at least one stirring device, and, in the lower part of the vessel, at least one opening for introducing liquid, in the upper part of the vessel at least one opening each for removing liquid and gas, a control means for the standing level of the liquid and a double jacket optionally subdivided into several zones, which apparatus is characterised in that the opening for removing liquid is arranged laterally in the wall of the cylindrical vessel at a distance situated 30 to 90% of the total internal height of the vessel above the opening(s) for introducing liquid provided in the lower third of the vessel, and a stirring device is provided inside the vessel which reaches upwards as far as, at a maximum, the level of the opening for removing the liquid, extends over 15 to 60% of the total internal height of the vessel, and stays a minimum distance of 15 cm from the vessel wall.

Advantageously, the apparatus according to the invention contains a measuring device for the standing level of the liquid, the measurement signal of which controls the quantity of dispersion removed, as well as, if desired, other measuring devices, for example for temperature and pressure.

The supply pipes in the lower part of the vessel may be arranged at the bottom or, advantageously, laterally in the jacket of the vessel at a maximum distance of 33% of the total internal height of the vessel from the bottom, and a cleaning opening may advantageously be arranged at the base. These supply lines advantageously contain means, for example, non-return valves or non-return flap valves, which, when there is excess pressure in the polymerisation vessel, prevent the mixture being polymerised from flowing back out of the vessel into the supply lines.

The opening arranged laterally in the wall of the vessel for discharging liquid should generally have a free cross-section at least 1.5 times the sum of all the free cross-sections of the inlet openings in the lower part of the vessel. This discharge opening is advantageously arranged at a distance situated 50 to 90%, especially 70 to 85% of the total internal height of the vessel from the liquid inlet opening or openings.

The apparatus furthermore contains at least one opening for the supply and discharge of gas, which is advantageously arranged in the cover of the cylindrical vessel in the vicinity of its highest point. Inert gas, for example nitrogen, can be supplied through this opening when the vessel is being emptied or before it is filled, or optionally for the purpose of pressure regulation.

The apparatus also contains at least one stirring device, for example a blade stirrer, of which the blade may be of varying geometrical shape. It may, for example, be square, rectangular, triangular, trapezoid or oval, or may be composed of several geometric figures, for example two triangles or trapeziums; it may have openings over its area and/or recesses of different shape at the edge. The stirring device may also consist of several blades with parallel axes, arranged at an angle with respect to one another. It is also possible to use other stirring devices, for example those having curved surfaces.

The stirring device may either be driven from above or from below. For constructional reasons a drive at the top is generally chosen.

Advantageously, the stirring device used is a blade stirrer, its greatest width being 25 to 80% of the internal diameter of the vessel, but it being necessary for the stirrer to stay at least 15 cm from the inside wall of the vessel; the stirrer extends over 20 to 40% of the total internal height of the vessel and ends approximately 5 cm below the discharge opening for the liquid.

Especially when the starting materials for the polymerisation are introduced separately through different pipes into the apparatus according to the invention, the apparatus advantageously contains, in the region of these supply lines, a second stirring device which may be operated independently of the stirring device described above but in the same direction of rotation. This second stirring device should have a diameter which is 25 to 80% of the internal diameter of the vessel, but should stay at a distance of at least 15 cm from the inner wall of the vessel and extend over a maximum of 10% of the total internal height of the vessel.

The apparatus according to the invention may be used especially advantageously when the ratio of height to diameter of the cylindrical vessel (both values measured internally) is from 4 to 16 and when the total capacity of the vessel is at least 5 m$^3$.

The invention will now be illustrated with reference to the drawing. It is not, however, limited thereto.

Figure 1:
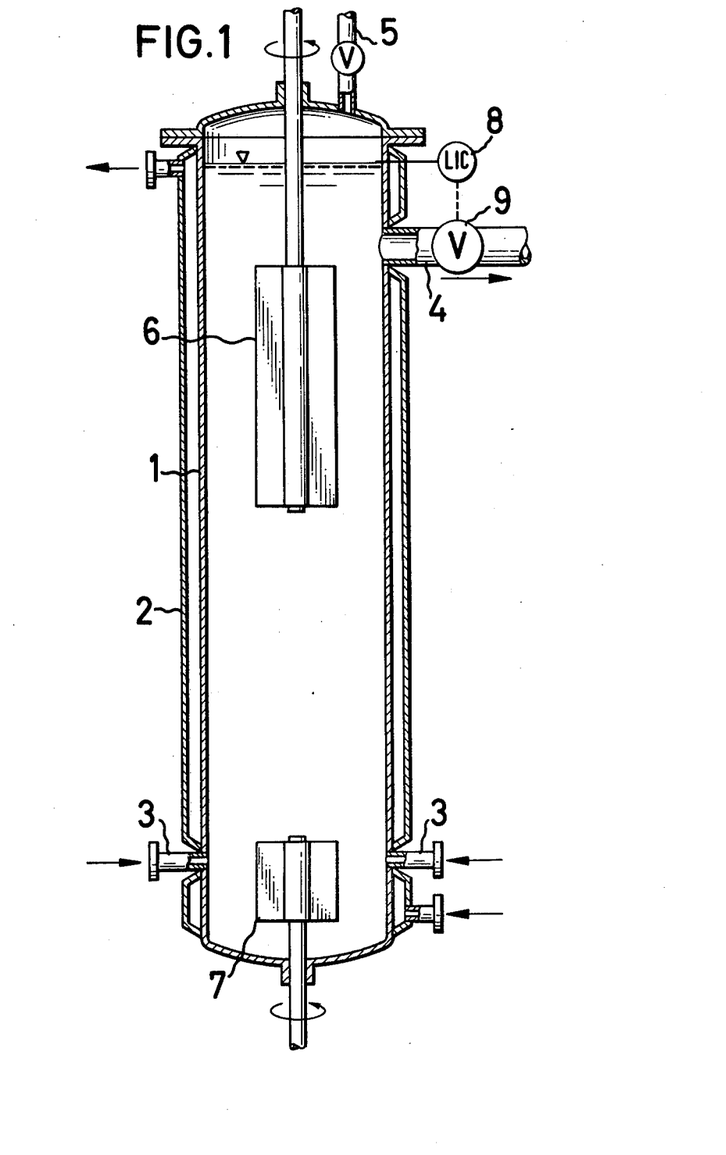

FIG. 1 shows in longitudinal section an apparatus according to the invention consisting of an upright, cylindrical vessel 1 with a double jacket 2 which vessel has in the vicinity of the bottom, in the wall, several inlet openings 3 for the liquid polymerisation starting substances, and at a distance situated at 70% of the internal height of the vessel an opening 4 for the removal of the polymer emulsion, and also an opening 5 in the cover for the supply and removal of gas. The apparatus contains a blade stirrer 6, which is completely immersed in the liquid, ends below the opening 4 for removing the polymer emulsion, and extends over 28% of the total internal height of the vessel. A second stirrer 7, the diameter of which is 42% of the internal diameter of the vessel, extends over 9% of the total internal height of the vessel and is arranged in the lower part of the container in the region of the inlet openings for the starting substances. This stirrer 7 is driven separately from the stirrer 6 arranged in the upper part of the vessel. The liquid level in the vessel is measured by a device 8 and the measured value is used to control via valve 9 the removal of the polymer emulsion. The ratio of height to diameter of the vessel (measured internally) is 4.6.

Figures 2, 3, 3A:
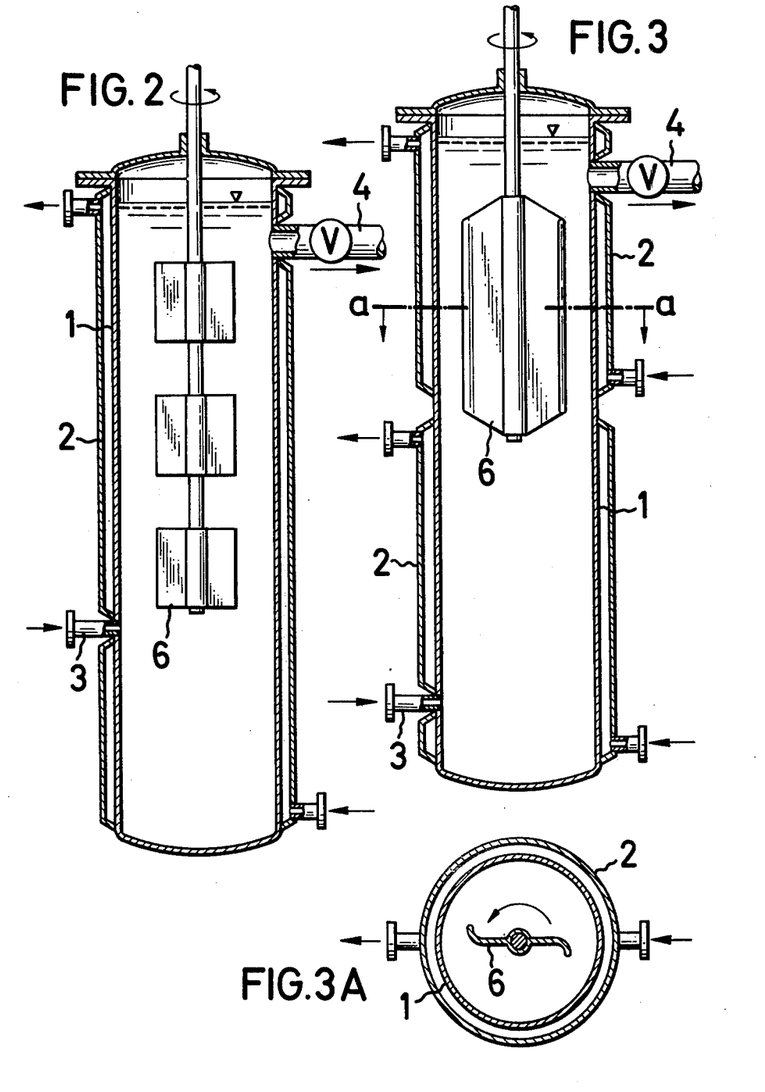

FIG. 2 shows in longitudinal section a further example of an apparatus according to the invention. The upright, cylindrical vessel 1 having a ratio of height to diameter of 4.5 contains a double jacket 2, an inlet opening for liquid in the lower third of the vessel situated at 32% of the total internal height of the vessel, a discharge opening for liquid situated at 88% of the total internal height of the vessel, as well as a blade stirrer 6, which extends over 50% of the total internal height of the vessel, the blade of which has a rectangular face and has two recesses at each longitudinal edge which are opposite one another. The opening for the supply and removal of gas and the level-regulating means have been omitted in the interests of clarity; they are arranged similarly to those in FIG. 1.

FIG. 3 shows in longitudinal section, a further example of an apparatus according to the invention. The upright, cylindrical vessel 1 having a ratio of height to diameter of 4.5, contains a double jacket 2 subdivided into two zones, an inlet opening for liquid in the lower third of the vessel, situated at 12% of the total internal height of the vessel, a discharge opening for liquid situated at 88% of the total internal height of the vessel, as well as a blade stirrer 6, which extends over 34% of the total internal height of the vessel and the blade of which has a double-trapezium-shaped face. The two trapezoid blade halves are curved in an S-shape perpendicular to the stirrer axis. As in FIG. 2, the gas supply and removal openings and the level-regulating means have been omitted; they are arranged similarly to those in FIG. 1.

FIG. 3A shows the apparatus according to FIG. 3 in section along the line a—a. 1 denotes the vessel wall, 2 the wall of the double jacket, 6 the S-shaped curved stirrer blade.

The following examples illustrate the invention

EXAMPLE 1

An upright, cylindrical polymerisation vessel having a capacity of over 5 cm$^3$, is used, which is equipped with a double jacket through which a liquid having a certain temperature flows, a blade stirrer, an inlet opening arranged in the lower third of the vessel and a discharge opening for liquid arranged in the upper third of the vessel, as well as an opening for the supply and removal of gas in the vessel cover, and a level measuring and regulating means which regulates the discharge of liquid.

The dimensions are as follows:

| | |
|---|---|
| Ratio of the height of the vessel to the diameter (measured inside the vessel | = 4.7 |
| Height of the liquid inlet | = 2% of the total internal height of the vessel |
| Height of the liquid outlet | = 80% of the internal height of the vessel |
| Length of the blade stirrer | = 37% of the internal height of the vessel |
| Diameter | = 55% of the internal diameter of the vessel |
| Distance of the vertical edges of the stirrer blade from the vessel wall | = 33 cm |
| Upper end of the blade stirrer | = at the same level as the liquid outlet |

After rinsing the polymerisation vessel with N$_2$ and heating the vessel to 50° C., a mixture of

| | | |
|---|---|---|
| 100 | parts by weight/h | vinyl chloride |
| 122 | parts by weight/h | water |
| 0.15 | part by weight/h | potassium persulfate |
| 0.4 | part by weight/h | E 1 = sodium salt of an alkylsulfo acid mixture containing 80% by weight of alkylsulfo acids having 14 to 16 carbon atoms |
| 1.6 | parts by weight/h | E 2 = sodium salt of sulfosuccinic acid diisodecyl ester |
| 0.1 | part by weight/h | sodium carbonate | is introduced continuously through the lower opening. The standing level of the liquid in the vessel is maintained at 92.6% of the total internal height of the vessel by regulating the discharge of liquid through the upper opening, and stirring is effected at a peripheral speed of 1.7 m/sec. The polymer emulsion drawn off is freed of unreacted vinyl chloride by relaxing the pressure and dried by spraying in hot air.

The polymerisation vessel is operated continuously for 840 hours, then shut down, emptied and opened. A uniform coating of polymer approximately 2 cm thick has formed on the parts of the apparatus covered by liquid. Polymer particles of a size of > 0.1 mm have settled on the base of the polymerisation vessel, and these are removed, washed, dried at 150° C. in a circulating air drying chamber for 2½ hours and weighed. The measured values, and the details of the maintenance work necessary during the course of the polymerization process, together with the time expended on this in man hours, are compiled in the following table.

Comparison experiment A

An upright, cylindrical polymerisation vessel of the same capacity, like that used in Example 1, is used, which is provided with a double jacket through which a liquid of a certain temperature flows, a blade stirrer, a discharge opening arranged in the base of the vessel and an inlet opening for the liquid arranged in the vessel cover, as well as a second opening in the vessel cover for the supply and removal of gas and a level measuring and regulating means which regulates the discharge of liquid, and which has the following dimensions:

| | |
|---|---|
| Ratio of the height of the vessel to the diameter (measured inside the vessel) | = 4.7 |
| Length of the blade stirrer | = 12% of the total internal height of the vessel |
| Diameter of the blade stirrer | = 55% of the internal diameter of the vessel |
| Distance of the vertical edges of the stirrer blade from the vessel wall | = 33 cm |
| Upper end of the blade stirrer | = 7.4% of the total internal height of the vessel from the highest point of the vessel cover. |

The polymerisation vessel is, as in Example 1, charged through the opening in the cover of the vessel with the same quantity/h of the same reaction mixture and polymerisation is effect at 50° C. (same temperature as in Example 1). The standing level of the liquid in the vessel is maintained, by regulating the discharge of liquid at the bottom of the vessel, at 92.6% of the total internal height of the vessel and the liquid is stirred at a peripheral speed of 1.7 m/sec. The polymer emulsion drawn off is filtered through a sieve with a mesh width of 6 mm, freed of unreacted vinyl chloride by relaxing the pressure and dried by spraying in hot air.

The polymerisation vessel can be operated continuously for a period of 372 hours only, then it must be shut down, emptied and opened for the purpose of cleaning.

In addition to a polymer coating approximately 4 cm thick on the parts of the apparatus covered by liquid, a thick deposit of polymer has formed on the stirrer and the vessel wall in the region of the surface of the liquid, and this has grown so thick that the covering on the stirrer, on rotation, grinds against the covering established on the vessel wall.

The sieve arranged in the outlet for the polymer emulsion has to be cleaned frequently during the operating time; the coarse polymer particles retained there are collected, washed, dried at 150° C. for approximately 2½ hours in a circulating air drying chamber and weighed. The measured values, and the details of the maintenance work necessary during the course of the polymerisation process, together with the time expended on this in man hours, are compiled in the following table.

EXAMPLE 2

An upright, cylindrical polymerisation vessel with a capacity of over 5 m$^3$ is used, which is provided with a double jacket through which a liquid of a certain temperature flows, a blade stirrer, a discharge opening for liquid arranged in the lower third of the vessel, as well as an opening for the supply and removal of gas in the vessel cover and a level measuring and regulating means which regulates the discharge of the liquid; the vessel has the following dimensions:

| | |
|---|---|
| Ratio of the height of the vessel to the diameter (measured inside the vessel) | = 4.7 |
| Level of the liquid inlet | = 2.9% of the total internal height of the vessel |
| Level of the liquid outlet | = 81% of the total internal height of the vessel |
| Length of the blade stirrer | = 20% of the total internal height of the vessel |
| Diameter of the blade stirrer | = 28% of the internal diameter of the vessel |
| Distance of the vertical edges of the | |

-continued

| | |
|---|---|
| stirrer blade from the vessel wall | = 52 cm |
| Upper end of the blade stirrer | = 20 cm below the outlet for the liquid. |

After rinsing the polymerisation vessel with $N_2$ and heating the vessel to 54° C., a mixture of

| | | |
|---|---|---|
| 4.4 | parts by weight/h | vinyl acetate |
| 87.5 | parts by weight/h | vinyl chloride |
| 115 | parts by weight/h | water |
| 0.1 | part by weight/h | potassium persulfate |
| 0.4 | part by weight/h | E 1 (see Example 1) |
| 1.4 | parts by weight/h | E 2 (see Example 1) |
| 0.1 | part by weight/h | sodium carbonate | is introduced continuously into the polymerisation vessel through the lower opening. The standing level of the liquid in the vessel is maintained at 92.6% of the total internal height of the vessel by regulating the discharge of liquid through the upper opening, and the liquid is stirred at a peripheral speed of 1.6 m/sec. The polymer emulsion is freed of unreacted vinyl chloride by relaxing the pressure, and dried by spraying in hot air.

The polymerisation vessel is operated continuously for 768 hours, then shut down, emptied and opened. A uniform coating of polymer approximately 2.5 cm thick has formed on the parts of the apparatus covered by the liquid. Polymer particles of a size of > 0.1 mm have settled on the base of the polymerisation vessel, and these are removed, washed, dried at 150° C. for 2½ hours in a circulating air drying chamber and weighed. The measured values, and the details of the maintenance work necessary during the course of the polymerisation process, together with the time expended on this in man hours, are compiled in the following table.

Comparison experiment B

An upright, cylindrical polymerisation vessel of the same capacity, like that used in Example 1, is used, which is provided with a double jacket through which a liquid having a certain temperature flows, a blade stirrer, a discharge opening arranged in the base of the vessel and an inlet opening for the liquid arranged in the vessel cover, as well as a second opening in the vessel cover for the supply and removal of gas and a level measuring and regulating means which regulates the discharge of liquid: the vessel has the following dimensions:

| | |
|---|---|
| Ratio of the height of the vessel to the diameter (measured internally) | = 4.7 |
| Length of the blade stirrer | = 12% of the total internal height of the vessel |
| Diameter of the blade stirrer | = 28% of the internal diameter of the vessel |
| Distance of the vertical edges of the stirrer blade from the vessel wall | = 52 cm |
| Upper end of the blade stirrer | = 7.4% of the total internal height of the vessel from the highest point of the vessel cover. |

As in Example 1, the polymerisation vessel is charged through the opening in the cover of the vessel with the same quantity/h of the same reaction mixture and polymerisation is effected at 54° C. (same temperature) in the same manner as in Example 1. The standing level of the liquid in the vessel is maintained at a distance which is 8% of the internal height of the vessel from the highest point of the vessel cover by regulating the discharge of liquid at the bottom of the vessel, and the liquid is stirred at a peripheral speed of 1.6 m/sec (as in Example 2). The polymer emulsion drawn off is filtered through a sieve with a mesh width of 6 mm, freed of unreacted vinyl chloride by relaxing the pressure and dried by spraying in hot air.

The polymerisation vessel can be operated continuously for a period of 408 hours only, then it must be shut down, emptied and opened for the purpose of cleaning.

In addition to a polymer coating approximately 5 cm thick on the parts of the apparatus covered by liquid, a thick deposit of polymer has formed on the stirrer and the vessel wall in the region of the surface of the liquid, and this has grown so thick that the covering on the stirrer, on rotation, grinds against the covering established on the vessel wall.

The sieve arranged in the outlet for the polymer emulsion has to be cleaned frequently during the operating time; the coarse polymer particles retained there are collected, washed, dried at 150° C. in a circulating air drying chamber and weighed. The measured values, and the details of the maintenance work necessary during the course of the polymerisation process, together with the time expended on this in man hours, are compiled in the following table.

EXAMPLE 3

An upright, cylindrical polymerisation vessel is used, which is provided with a double jacket through which a liquid of a certain temperature flows, a blade stirrer, an inlet opening arranged in the lower third of the vessel, and a discharge opening for liquid arranged in the upper third of the vessel, as well as an opening for the supply and removal of gas in the vessel cover and a level measuring and regulating means which regulates the discharge of liquid; the vessel has the following dimensions:

| | |
|---|---|
| Ratio of the height of the vessel to the diameter (measured internally) | = 4.5 |
| Level of the liquid inlet | = 17% of the total internal height of the vessel |
| Level of the liquid outlet | = 87% of the total internal height of the vessel |
| Length of the stirrer blade | = 37% of the total internal height of the vessel |
| Diameter of the stirrer blade | = 61% of the internal diameter of the vessel |
| Distance of the vertical edges of the stirrer blade from the vessel wall | = 29 cm |
| Upper end of the stirrer blade | = 10 cm below the liquid outlet |

After rinsing the polymerisation vessel with $N_2$ and heating the vessel to 64° C., a mixture of

| | | |
|---|---|---|
| 100 | parts by weight/h | vinyl chloride |
| 109 | parts by weight/h | water |
| 0.08 | part by weight/h | potassium persulfate |
| 2.1 | parts by weight/h | E 3 = sodium salt of dodecylbenzenesulfo acid |
| 0.07 | part by weight/h | secondary sodium phosphate | is introduced continuously into the polymerisation vessel through the lower opening. The standing level of the liquid in the vessel is maintained at 96% of the total internal height of the vessel by regulating the liquid discharge through the upper opening, and the liquid is stirred at a peripheral speed of 1.6 m/sec. The polymer emulsion drawn off is freed of unreacted vinyl chloride by relaxing the pressure, and dried by spraying in hot air.

The polymerisation vessel is operated continuously for 960 hours, then shut down, emptied and opened. A uniform polymer coating approximately 2 cm thick has formed on the parts of the apparatus covered by liquid. Polymer particles of a size of > 0.1 mm have settled on the base of the polymerisation vessel, and these are removed, washed, dried at 150° C. for 2½ hours in a circulating air drying chamber and weighed. The measured values, and the details of the maintenance work necessary during the course of the polymerisation process, together with the time expended on this in man hours, are compiled in the following table.

Comparison Experiment C

An upright, cylindrical polymerisation vessel of the same capacity, like that used in Example 1, is used, which is provided with a double jacket through which a liquid of a certain temperature flows, a blade stirrer, an inlet opening for liquid arranged in the vessel base as well as a second opening in the vessel cover for the supply or removal of gas and a level measuring and regulating means which regulates the discharge of liquid, and has the following dimensions

| | |
|---|---|
| Ratio of the height of the vessel to the diameter (measured internally) | = 4.5 |
| Length of the blade stirrer | = 12% of the total internal height of the vessel |
| Diameter of the blade stirrer | = 61% of the internal diameter of the vessel |
| Distance of the vertical edges of the stirrer blade from the vessel wall | = 29 cm |
| Upper end of the blade stirrer | = 8.8% of the total internal height of the vessel from the highest point of the vessel cover. |

As in Example 1, the polymerisation vessel is charged through the opening in the cover of the vessel with the same quantity/h of the same reaction mixture and polymerisation is effected at 64° C. (same temperature) in the same manner as in Example 1. The standing level of the liquid in the vessel is maintained at a distance which is 10.3% of the total internal height of the vessel from the highest point of the vessel cover by regulating the discharge of liquid at the bottom of the vessel, and the liquid is stirred at a peripheral speed of 1.6 m/sec. (as in Example 1). The polymer emulsion drawn off is filtered through a sieve having a mesh width of 6 mm, is freed of unreacted vinyl chloride by relaxing the pressure, and dried by spraying in hot air.

The polymerisation vessel can be operated continuously for a period of 528 hours only, then it has to be shut down, emptied and opened for the purpose fo cleaning.

In addition to a polymer coating approximately 6 cm thick on the parts of the apparatus covered by liquid, a thick deposit of polymer has formed on the stirrer and the vessel wall in the region of the surface of the liquid, and this has grown so thick that the covering on the stirrer, on rotation, grinds against the covering established on the vessel wall.

The sieve in the outlet for the polymer emulsion has to be cleaned frequently during the operating time; the polymer particles retained there are collected, washed, dried at 150° C. in a circulating air drying chamber and weighed. The measured values, and the details of the maintenance work necessary during the course of the polymerisation process, together with the time expended on this in man hours, are compiled in the following table.

EXAMPLE 4

An upright, cylindrical polymerisation vessel having a capacity of over 25 m³ is used, which is provided with a double jacket through which a liquid of a certain temperature flows, a blade stirrer, an inlet opening arranged in the lower third of the vessel, and an outlet opening for liquid arranged in the upper third of the vessel, as well as an opening for the supply and removal of gas in the vessel cover and a level measuring and regulating means which regulates the discharge of liquid; the vessel has the following dimensions:

| | |
|---|---|
| Ratio of the height of the vessel to the diameter (measured internally) | = 8.5 |
| Height of the liquid inlet | = 11.5% of the total internal height of the vessel |
| Height of the liquid outlet | = 80% of the total internal height of the vessel |
| Length of the blade stirrer | = 39% of the total internal height of the vessel |
| Diameter of the blade stirrer | = 67% of the internal diameter of the vessel |
| Distance of the vertical edges of the stirrer blade from the vessel wall | = 27 cm |
| Upper end of the stirrer blade | = 10 cm below the discharge of liquid |

After the polymerisation vessel has been rinsed with $N_2$ and heated to 43° C., a mixture of

| | | |
|---|---|---|
| 166 | parts by weight/h | vinyl chloride |
| 195 | parts by weight/h | water |
| 0.13 | part by weight/h | potassium persulfate |
| 0.035 | part by weight/h | sodium bisulfite |
| 4.2 | parts by weight | E 1 (see Example 1) |
| 0.27 | part by weight/h | sodium carbonate |
| 0.00035 | part by weight | copper sulfate | is introduced continuously into the polymerisation vessel through the lower opening. The standing level of the liquid in the vessel is maintained at 86% of the total internal height of the vessel by regulating the discharge of liquid through the upper opening and the liquid is stirred at a peripheral speed of 1.5 m/sec. The polymer emulsion drawn off is freed of unreacted vinyl chloride by relaxing the pressure and dried by spraying in hot air.

The polymerisation vessel is operated continuously for 840 hours, then shut down, emptied and opened. A uniform polymer covering approximately 1 cm thick has formed on the parts of the apparatus covered by liquid. Polymer particles of a size of 0.1 mm have been deposited on the base of the polymerisation vessel, and these are removed, washed, dried at 150° C. for 2½ hours in a circulating air drying chamber and weighed. The measured values, and the details of the maintenance work necessary during the course of the polymerisation process, together with the time expended on this in man hours, are compiled in the following table.

TABLE

| Experiment no. | Polym. Temp. °C | Duration of Polymer-isation h | Routine maintenance work | | | | Total maintenance expenditure (man hours) |
| --- | --- | --- | --- | --- | --- | --- | --- |
| | | | Cleaning 6mm sieve | Vessel outlet cleared | Cleaning of outlet pipe | Total quantity of coarse polymer particles (grit) | Stoppage, cleaning vessel, restarting |
| Example 1 | 50 | 840 | — | 7 x | 2 x | 1.20 t | — | 3.8 |
| Comparison A | 50 | 744 | 34 x | 84 x | 8 x | 1.8 t | 1 x | 70.6 |
| Example 2 | 54 | 768 | — | 3 x | 1 x | 0.63 t | — | 1.8 |
| Comparison B | 54 | 816 | 38 x | 24 x | 6 x | 1.16 t | 1 x | 55.6 |
| Example 3 | 64 | 960 | — | — | 7 x | 0.7 t | — | 7 |
| Comparison C | 64 | 1056 | 40 x | 68 x | 16 x | 1.92 t | 1 x | 77.6 |
| Example 4 | 43 | 840 | — | 1 x | 3 x | 0.85 t | — | 3.3 |

Example 1 VC-homopolymer, K = 72, according to DIN 53 726
Example 2 VC-VAc-copolymer, K = 70 according to DIN 53 726
Example 3 VC-homopolymer, K = 59, according to DIN 53 726
Example 4 VC-homopolymer, K = 78 according to DIN 53 726

What is claimed is:

1. In a process for the continuous production of vinyl chloride homo-, co- or graft polymers in aqueous emulsion in the presence of radical-forming catalysts, surface active substances in the upright, cylindrical vessel with a ratio of height to diameter of at least 3 and a capacity of at least 5 m³, whilst stirring the polymerization mixture and regulating the level of the liquid in the vessel, the improvement which comprises discharging the polymerization emulsion from the vessel at the side at a level which is situated 30 to 90% of the total internal height of the vessel above the inlet for the starting substances and at least 15 cm below the surface of the liquid, regulating the standing level of the liquid to a maximum of 97% of the total internal height of the vessel and stirring the content of the vessel by at least one stirring device which extends in the liquid over 15 to 60% of the total internal height of the vessel, ends at least 20 cm below the surface of the liquid and stays at a distance of at least 15 cm from the vessel wall.

2. Process according to claim 1, wherein the discharge of the polymer emulsion is effected at a level situated 50 to 90% of the total internal height of the vessel above the inlet for the starting substances.

3. Process according to claim 2, wherein the discharge of the polymer emulsion is effected at a level situated 70 to 85% of the total internal height of the vessel above the inlet for the starting substances.

4. Process according to claim 1, wherein the distance of the surface of the liquid from the discharge opening is regulated at 8 to 25% of the total internal height of the vessel, but is at least 40 cm.

5. Process according to claim 1, wherein the stirring device extends in the liquid over 20 to 40% of the total internal height of the vessel, and ends approximately 25 cm below the surface of the liquid.

6. Process according to claim 1, wherein the liquid in the polymerisation vessel is moved in the region of the inlet opening(s) for the starting substances by a second stirrer which stays at least 15 cm from the inner wall of the vessel, extends over a maximum of 10% of the total internal height of the vessel and rotates in the same direction as the first stirring device.

7. Process according to claim 1, wherein the vinyl chloride polymers continuously produced have a content of at least 80% (calculated on pure polymer) of polymerised vinyl chloride units.

* * * * *